United States Patent

Noel

[11] Patent Number: 6,021,595
[45] Date of Patent: Feb. 8, 2000

[54] CHEMILUMINESCENT BAIT FOR FISHING

[76] Inventor: Eric Yves Noel, 64 rue de Longchamp, Neuilly, 92200, France

[21] Appl. No.: 08/772,154

[22] Filed: Dec. 20, 1996

[30] Foreign Application Priority Data

Dec. 22, 1995 [FR] France .................................. 95 15336

[51] Int. Cl.[7] .................................................. A01K 85/00
[52] U.S. Cl. .............................................. 43/17.6; 362/34
[58] Field of Search ..................... 43/17.5, 17.6, 43/42.08, 42.23, 42.36, 42.49, 44.83, 44.84, 44.85; 362/34, 391

[56] References Cited

U.S. PATENT DOCUMENTS

| | | | |
|---|---|---|---|
| 86,154 | 1/1869 | Hiltz | 43/44.83 |
| 2,466,939 | 4/1949 | Fowler | 43/44.85 |
| 2,552,224 | 5/1951 | Setterblade | 43/42.07 |
| 2,880,547 | 4/1959 | Mills | 43/42.49 |
| 3,535,815 | 10/1970 | Lowndes | 43/44.85 |
| 3,576,987 | 5/1971 | Voight | 43/17.6 |
| 3,861,072 | 1/1975 | Holcombe | 43/17.6 |
| 3,863,380 | 2/1975 | Purlia | 43/17.6 |
| 3,898,760 | 8/1975 | Klein | 43/44.83 |
| 3,918,190 | 11/1975 | Hornbeck | 43/4.5 |
| 3,921,328 | 11/1975 | Holcombe | 43/17.6 |
| 4,520,588 | 6/1985 | Hindermyer | 43/17.6 |
| 4,535,562 | 8/1985 | Fry | 43/42.49 |
| 4,638,584 | 1/1987 | Lindsay | 43/17.6 |
| 4,649,664 | 3/1987 | Mahan | 43/44.83 |
| 4,800,670 | 1/1989 | Mattison | 43/17.6 |
| 5,195,266 | 3/1993 | Troescher | 43/17.6 |
| 5,213,405 | 5/1993 | Giglia | 362/34 |
| 5,673,988 | 10/1997 | Fujita | 362/34 |

FOREIGN PATENT DOCUMENTS 2 044 061  10/1980  United Kingdom.

Primary Examiner—Kurt Rowan
Attorney, Agent, or Firm—Leonard Bloom

[57] ABSTRACT

A bait for fishing is disclosed wherein the bait is attachable to lines of various diameters. The attachment means is integral to the elongated body of the bait made of a resilient plastic material and comprises at one end a slot with successive internal perpendicular grooves of different dimensions for receiving and maintaining the line. The bait is hollow and produces light resulting from a chemiluminescent reaction of two components originally stored in two separate compartment.

1 Claim, 2 Drawing Sheets

CHEMILUMINESCENT BAIT FOR FISHING

BACKGROUND OF THE INVENTION

The present invention relates to a bait for fishing, in particular a disposable chemiluminescent bait.

It is already known that chemiluminescent baits may be used to attract fishes (see for example U.S. Pat. Nos. 3,921,328 4,638,584 and 5,213,405). These baits are advantageous substitutes to electric luminous baits (U.S. Pat. No. 2,552,224 and UK application 2,044,061).

For some industrial fishing operations, the lines are provided with hundreds of fish-hooks as well as appropriately spaced baits or lures. These lures must be activated and secured manually to the lines by the fishermen. Such an operation may take some time but must be performed as quickly as possible. The fixing of the lure to the line is most often performed with the help of an elastic band fixed to a hole provided at one end of the lure, or with the help of clips.

Disclosure of the Invention

The present invention is directed to a lure that may be easily and quickly secured to a line, the fixation system being simple, cheap and reliable. The invention allows also for the easy removal of the lures after the fishing, an operation which for economical reasons must also be performed as quickly and easily as possible.

The effort necessary to introduce and to withdraw the lures is an important feature for judging the suitability of a fixing or attaching means.

One further problem, solved by the present invention, arise from the fact that a wet fishing line may show a different diameter compared with the same dry fishing line so that the attachment is facilitated if several levels of fixation with different diameters are provided. Furthermore the properties of the same fishing lines may differ according to various parameters. The line may be new or old, frayed or not, or may be more or less greasy.

For example, one level of fixation would be adapted for a dry fishing line, the other for a wet fishing line, and the third for a greasy fishing line.

The bait or lure according to the invention is generally in the form of a plastic tubular member (for example from 10 to 20 cm long and 1 cm wide), at least a portion of the tubular member is transparent or translucent, which is sealed at both ends and comprises an arrangement able to produce light. The arrangement comprises two compartments filled with different components, preferably liquid components.

When activation is required, the means of separation of the compartment is broken, tear or tilted. The liquid components will mix and a chemiluminescent reaction will occur that will generally last a few hours.

The above components are commercially available and described in various patent applications and example of these chemiluminescent light systems can be found in U.S. Pat. Nos. 3,479,679, 3,391,068 and 3,97,368 and are based on a the reaction of a fluorescer and a peroxalate.

The plastic tube is advantageously made of thermoplastic material such as polyethylene or polypropylene and may be manufactured from corresponding moulds.

According to a preferred embodiment of the invention, one end portion of a plastic tube, forming a stick comprising the liquid components located within the cylindrical hollows of the tube, is provided with an integrated fixation means resulting in a easy, quick and reliable attachment of the lure to the line. According to an essential feature of the invention, the fixation means allows the adaptation of fishing lines of various diameters and/or of various properties.

According to a particularly advantageous embodiment of the invention, the tubular body is provided at the end to be fixed with a side bevelled notch extending inwardly up or near to the tubular axis, at which point there is initiated a slot, parallel to said axis, extending longitudinally across the tube and outwardly with respect to the main body of the tube. Typically the opposite surfaces of the slot are separated by a distance varying from 0.5 mm to 3 mm.

The internal walls, or at least a section thereof, of the gap resulting from the presence of the slot are provided with successive grooves, preferably in the form of arcs of circle or half circles, opposite and complementary and able to receive and secure the fishing line of an appropriate diameter, by pinching and by friction. The material of the main body must be consequently sufficiently resilient, a condition easily met with polypropylene.

According to a particular embodiment, the dimensions of the grooves decrease towards the end of the tube, forming in that way various fixations levels. This feature will allow the lure to be fixed on lines of different diameters; the fixing means is therefore a multi-grip means able to be advantageously used with various line diameters.

Advantageously, the integral multi-grip hook is formed by injection moulding together with the enveloppe forming the luminous element. Alternatively, the hook may be made by machining the end of the massive part of the elongated member forming the chemiluminescent lure.

In use, the lightstick is attached to a fishing line by placing the line in the bevelled notch and forcibly pulling the main body so as to cause the line to be positioned in the slot at the most suitable level defined by one of the grooves. The opposed cantilever forces of the arcs of circle maintain the line and prevent any movement along the line. Said force is dependent on the location of attachment, that is to say on the groove which is actually used to grip the line.

DETAILED DESCRIPTION OF THE SHOWN EMBODIMENT

A non-limitative example of an article according to the invention is illustrated in the attached drawing.

Figure 1:
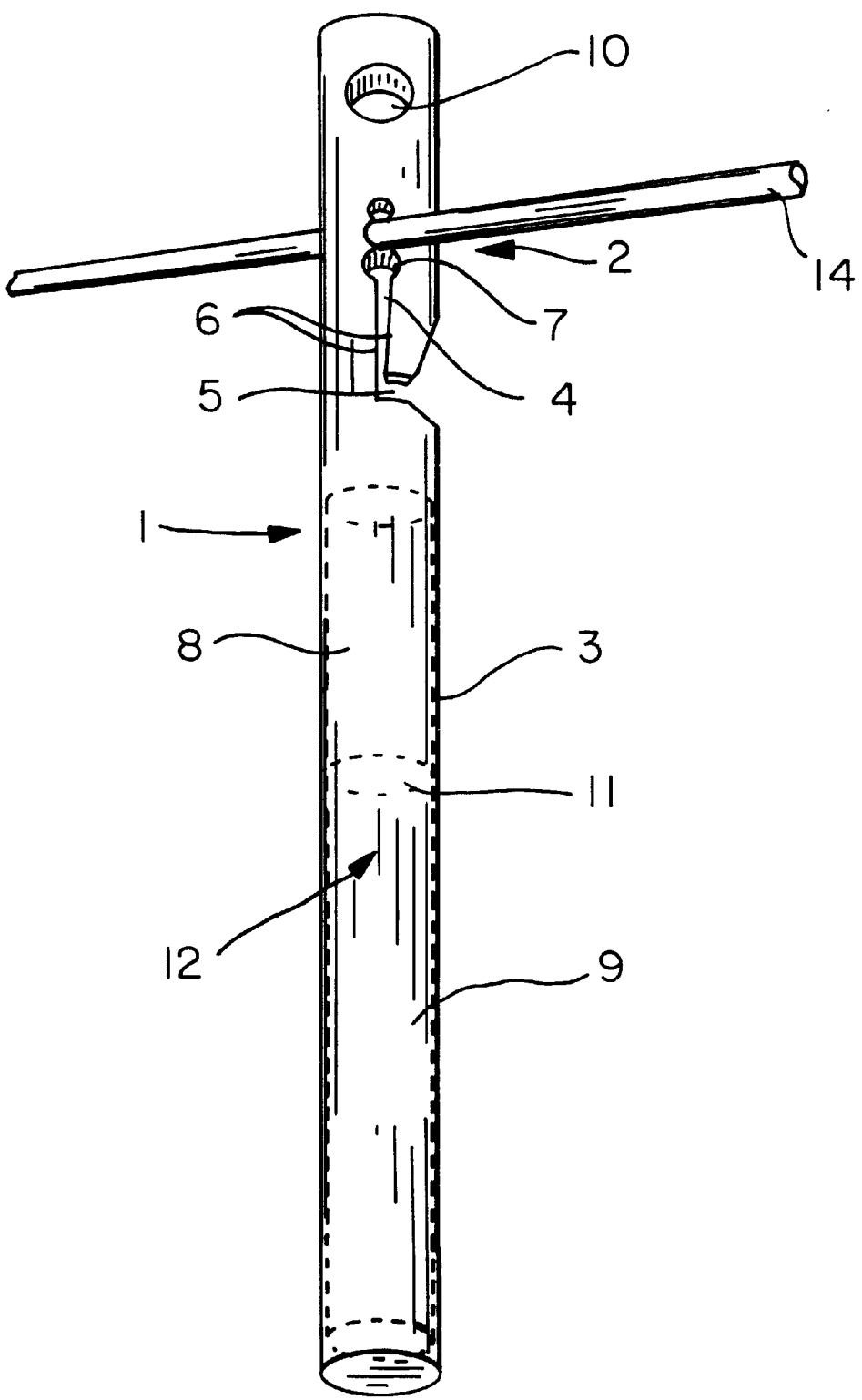
FIG. 1 is a perspective view of a complete lure according to the invention attached to a fishing line.

FIG. 1 illustrates a lure 1 for fishing comprising a fixing means 2 for fixation to a line 14 and an elongated body 3 made of translucent polypropylene comprising an arrangement 12 able to produce light. The fixing means 2 is integrated to the body at the end to be fixed and comprise a longitudinal slot 4 extending across the tubular element and, at the end nearest the main part of the tubular body, leading to a large perpendicular side notch 5 with bevels. The slot 4 is central or nearly central with respect to the transverse section of the main body and is opened in such a way that the line may be introduced in the slot through the side notch.

Figure 2:
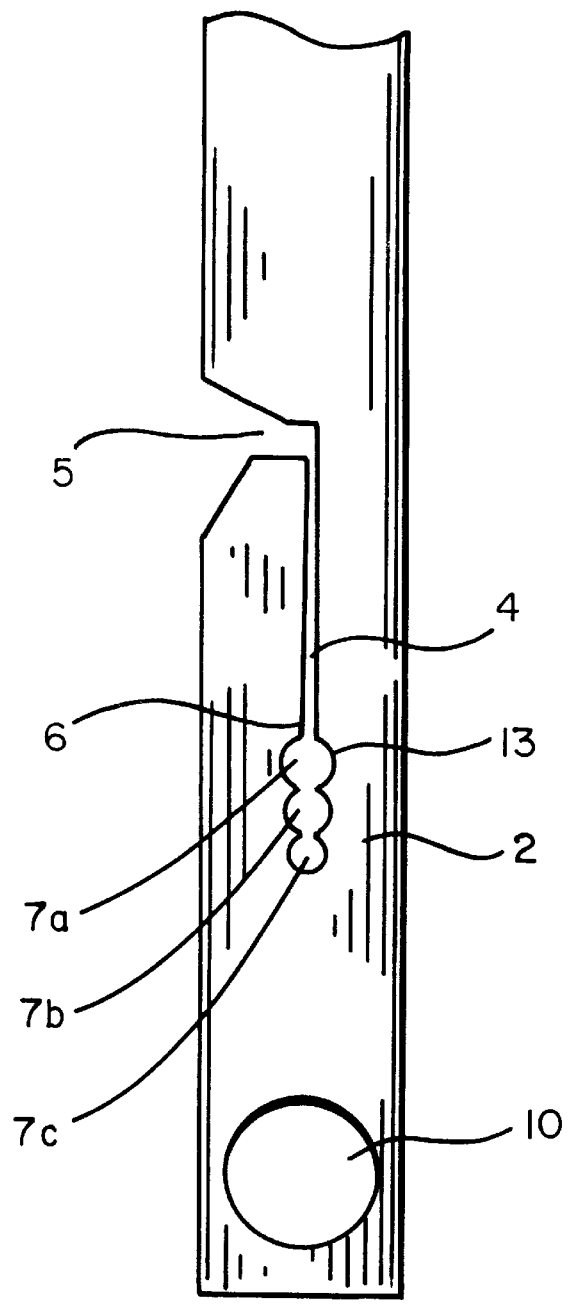
FIG. 2 is a schematic enlarged view of a longitudinal section of the fixing end of the lure of FIG. 1.
Figure 3:
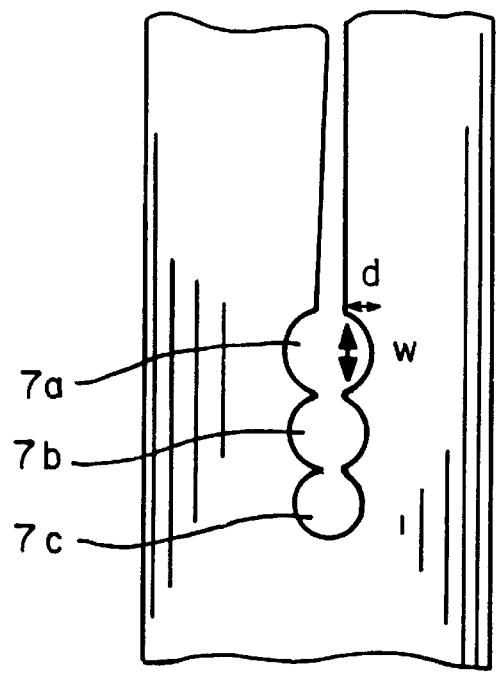
FIG. 3 is an enlarged view of the grooves of FIG. 2.

As shown more clearly in FIG. 2, the opposing surfaces 6 of the slot are provided with 3 rectilinear grooves 7 in the form of arcs of a circle 13 of a diameter adapted to usual diameters of fishing lines, said grooves being perpendicular to the axis of the tubular body and therefore able to receive and retain by pinching action such fishing lines. Advantageously a hole 10 is provided for a possible complemental fixing using a traditional prior art method. As shown also more clearly in FIG. 3, the dimensions (depth d and widths w) of the grooves 7*a,* 7*b,* 7*c* are slightly different in order to provide, in conjunction with the resiliency of the material used for the body, different pinching and friction actions adapted for fixation to fishing lines of usual diameter. In the embodiment shown in FIGS. 2 and 3, the dimensions decreases towards the end of the bait to be fixed.

The arrangement 12 in the elongated body comprises two compartments 8,9 separated by a disk or a diaphragm 11 secured by friction perpendicular to the tubular axis. The disk may be manually tilted in order to provoke the mixing of the components resulting in a chemiluminescent reaction.

What I claim is:

1. A bait for fishing comprising a means for fixing a fishing line and an elongated body, at least a portion of the body being translucent, the elongated body comprising two ends, one of said ends being destined to be fixed to said fishing line, said bait further comprising an arrangement able to produce light, said fixing means being integral and internal to said body and being located at the end to be fixed, said fixing means comprising a longitudinal slot which is open, opposite the end to be fixed, through a side notch;

said slot having opposite surfaces provided with at least two successive grooves perpendicular to the axis of the elongated body and capable to receive and retain by pinching action a fishing line, and successive grooves have widths and depths decreasing towards the end to be fixed.

\* \* \* \* \*